United States Patent
Höcks et al.

(10) Patent No.: US 12,024,074 B2
(45) Date of Patent: Jul. 2, 2024

(54) ENERGY ABSORBING MOUNTING STRUCTURE

(71) Applicant: Ningbo Geely Automobile Research & Development Co., Ltd., Ningbo (CN)

(72) Inventors: Johan Höcks, Varberg (SE); Martin Gustavsson, Torslanda (SE)

(73) Assignee: Ningbo Geely Automobile Re search & Dev. Co., Ltd., Ningbo (CN)

(*) Notice: Subject to any disclaimer, the term of this patent is extended or adjusted under 35 U.S.C. 154(b) by 115 days.

(21) Appl. No.: 17/681,733

(22) Filed: Feb. 26, 2022

(65) Prior Publication Data
US 2022/0274513 A1 Sep. 1, 2022

Related U.S. Application Data

(63) Continuation of application No. PCT/CN2020/111875, filed on Aug. 27, 2020.

(30) Foreign Application Priority Data

Sep. 4, 2019 (EP) .................................... 19195421

(51) Int. Cl.
*B60N 2/427* (2006.01)
*B60N 2/07* (2006.01)

(52) U.S. Cl.
CPC ....... *B60N 2/42709* (2013.01); *B60N 2/0715* (2013.01)

(58) Field of Classification Search
CPC .............. B60N 2/4214; B60N 2/42709; B60N 2/4221; B60N 2/4228; B60N 2/0715; B60N 2/0722; B60N 2/682
See application file for complete search history.

(56) References Cited

U.S. PATENT DOCUMENTS 3,631,740 A * 1/1972 Gavagan .............. B60N 2/0843
296/68.1
3,669,397 A * 6/1972 Le Mire ............. B60N 2/42736
297/216.19
(Continued)

FOREIGN PATENT DOCUMENTS

BN 2355399 A * 4/2001 .......... B60N 2/0715
CN 204055447 U 12/2014
(Continued)

OTHER PUBLICATIONS

International Search Report from corresponding International Application No. PCT/CN2020/111875, dated Dec. 3, 2020, 2 pages.

*Primary Examiner* — Eret C Mcnichols
(74) *Attorney, Agent, or Firm* — Tucker Ellis LLP

(57) ABSTRACT

An energy absorbing mounting structure for a vehicle seat. The mounting structure includes a linear rail configured for being fastened to a vehicle passenger cabin floor structure and a deformable element. The deformable element has a first attachment portion, a second attachment portion and a deformable section arranged between the first and second attachment portions. The first attachment portion is fastened to the rail and the second attachment portion is configured for being fastened to the vehicle passenger cabin floor structure via an opening in a bottom of the rail for enabling relative motion between the floor structure and the rail in a longitudinal direction of the rail by deformation of the deformable section in the event of a vehicle crash.

19 Claims, 9 Drawing Sheets

(56) References Cited

U.S. PATENT DOCUMENTS

| | | | | |
|---|---|---|---|---|
| 3,724,603 | A * | 4/1973 | Shiomi | F16F 7/123 |
| | | | | 293/133 |
| 5,150,871 | A | 9/1992 | Negi | |
| 5,464,252 | A | 11/1995 | Kanazawa | |
| 7,207,541 | B2 * | 4/2007 | Frohnhaus | B60N 2/0715 |
| | | | | 297/216.16 |
| 7,731,281 | B2 * | 6/2010 | Kurita | B60N 2/42709 |
| | | | | 296/68.1 |
| 8,052,195 | B2 * | 11/2011 | Aufrere | B60N 2/42745 |
| | | | | 296/68.1 |
| 9,821,759 | B2 * | 11/2017 | Farooq | B60R 22/24 |
| 10,661,750 | B2 * | 5/2020 | Jaradi | B60R 22/1952 |
| 10,814,750 | B2 * | 10/2020 | Jonsson | B60N 2/7094 |
| 11,292,374 | B2 * | 4/2022 | Busch | B60N 2/682 |
| 2002/0053820 | A1 | 5/2002 | Feichtinger | |
| 2002/0084131 | A1 | 7/2002 | Motozawa | |
| 2004/0183344 | A1 * | 9/2004 | Glance | B60N 2/42709 |
| | | | | 297/216.1 |
| 2010/0176621 | A1 | 7/2010 | Aufrere | |
| 2018/0215290 | A1 | 8/2018 | Varcus | |

FOREIGN PATENT DOCUMENTS

| | | | | |
|---|---|---|---|---|
| CN | 108136942 A | | 6/2018 | |
| DE | 3042379 A1 | * | 6/1982 | |
| DE | 19613506 C2 | | 2/1998 | |
| DE | 19942973 A1 | * | 3/2001 | ............... B60N 2/06 |
| DE | 102008025135 A1 | * | 12/2009 | ............ B60N 2/015 |
| DE | 102011055860 A1 | | 6/2013 | |
| DE | 102017209986 A1 | | 8/2018 | |
| GB | 2330068 A | * | 4/1999 | ........... B60N 2/4214 |
| JP | 2001260726 A | | 9/2001 | |
| JP | 2016097963 A | * | 5/2016 | ........... B60N 2/2803 |
| KR | 20030097224 A | | 12/2003 | |
| KR | 20090061799 A | | 6/2009 | |
| WO | 2005039922 A1 | | 5/2005 | |
| WO | 2006068567 A1 | | 6/2006 | |
| WO | 2008017794 A2 | | 2/2008 | |

* cited by examiner

C-C

A-A

B-B

ENERGY ABSORBING MOUNTING STRUCTURE

RELATED APPLICATION DATA

This application is a continuation of International Patent Application No. PCT/CN2020/111875, filed Aug. 27, 2020, which claims the benefit of European Patent Application No. 19195421.3, filed Sep. 4, 2019, the disclosures of which are incorporated herein by reference in their entireties.

TECHNICAL FIELD

The present disclosure relates to an energy absorbing mounting structure for a vehicle seat. The disclosure further relates to a method for providing an energy absorbing mounting of a vehicle seat.

Although the disclosure will be described primarily in relation to a car, the disclosure is not restricted to this particular vehicle, but may as well be installed in another type of vehicle, such as a truck, a bus, an off-road vehicle, a mining vehicle, an agriculture vehicle, a working vehicle such as a wheel loader or excavator, a forest vehicle such as harvesters or forwarders, a marine vessel, or the like.

BACKGROUND

In the field vehicle safety there is a demand for low-cost and efficient solutions for providing high passenger safety in case of vehicle accident, such as a vehicle collision or crash. For example, it is known to provide air bags, collapsible backrest, active head restraints, belt force limiter, etc. for increasing passenger safety.

One example of a safety arrangement for a vehicle sear is known from document WO 2005/39922 A1. However, despite the activities in the field, there is still a demand for a further safety arrangement for mounting of a seat that is capable of meeting the requirements as to improved energy absorption, low cost and non-complex design.

SUMMARY

An object of the present disclosure is to provide an energy absorbing mounting structure for a vehicle seat where the previously mentioned problems are avoided. This object is at least partly achieved by the features of the independent claim.

Specifically, according to a first aspect of the present disclosure, there is provided an energy absorbing mounting structure for a vehicle seat. The mounting structure comprises a linear rail configured for being fastened to a vehicle passenger cabin floor structure and a deformable element. The deformable element has a first attachment portion, a second attachment portion and a deformable section arranged between the first and second attachment portions. Moreover, the first attachment portion is fastened to the rail and the second attachment portion is configured for being fastened to a vehicle passenger cabin floor structure via an opening in a bottom of the rail for enabling relative motion between the floor structure and the rail in a longitudinal direction of the rail by deformation of the deformable section in the event of a vehicle crash.

According to a second aspect of the present disclosure, there is provided a method for providing an energy absorbing mounting of a vehicle seat enabling relative motion between a floor structure of the vehicle and a seat rail in a longitudinal direction of the vehicle while absorbing energy by deformation of a deformable element in the event of a vehicle crash. The method comprises providing a linear rail and a deformable element, wherein the deformable element has a first attachment portion, a second attachment portion and a deformable section arranged between the first and second attachment portions, and wherein the first attachment portion is fastened to the rail. The method further comprises fastening the second attachment portion to the vehicle passenger cabin floor structure via an opening in a bottom of the rail, and fastening of the vehicle seat to the rail.

In this way, various advantages are accomplished. For example, by fastening the rail to the floor structure via the deformable element, the rail and the entire seat mounted thereon are allowed to move slightly in the longitudinal direction of the vehicle upon deformation of the deformable element. Thereby, a truly low-cost but still efficient vehicle safety feature is provided, that reduces risk for injuries, such as whiplash injuries, in connection with vehicle accident.

In particular, by having the second attachment portion configured for being fastened to a vehicle passenger cabin floor structure via an opening in a bottom of the rail, a simplified and more cost-efficient handling of the rail and deformable element is accomplished because the deformable element may be fastened to rail in connection with manufacturing of the rail, and the pre-assembled rail and deformable element unit may subsequently be transported to, and stored at, the vehicle assembly line as a single component. Furthermore, the rail and deformable element may also be easily and cost-efficiently mounted to the floor structure because a human assembly operator or industrial assembly robot may secure the rail and deformable element to the floor structure by a single operation, such as for example by attaching a single screw. Moreover, by using a common rail, and merely adding an opening therein and a deformable element, relatively non-complex and nearly conventional components are used, thereby enabling use of already available manufacturing tools, such that overall cost for the energy absorbing mounting structure may be kept low. Finally, the energy absorbing mounting structure also reduces peak stress levels within the floor structure in the attachment areas of the rails, such that a slightly less rigid and less reinforced, but lighter, floor structure may be adopted, thereby enabling improved vehicle fuel and/or energy economy.

Further advantages are achieved by implementing one or several of the features of the dependent claims. For example, the deformable element may be located within the rail. Thereby, a compact design is accomplished while enabling good protection of the deformable element against undesirable interference with adjacent objects or dirt.

In some example embodiments, the first attachment portion of the deformable element is fastened to an interior bottom surface of the rail. Thereby, a simple and straightforward attachment of the deformable element to the rail is accomplished, and the first attachment point is also relatively accessible for tools required for preforming said attachment.

In some example embodiments, the rail has a generally U-shaped cross-sectional profile with a hollow interior recess being accessible via an upwards facing opening extending along the longitudinal direction of the rail, wherein the deformable element is located in said hollow interior recess. Thereby, a strong and economical rail design is used, that also provided good protection of the deformable element against undesirable interference with adjacent objects or dirt.

In some example embodiments, the deformable element has a third attachment portion and a further deformable section arranged between the second and third attachment portions, and the third attachment portion is fastened to the rail. Thereby, the deformable element is provided with two deformable sections that may have the same or differing characteristic, such the energy absorbing mounting structure may be better adapted to the specific circumstances of the each implementation. Moreover, by locating the second attachment portion, which is configured for being fastened to a vehicle passenger cabin floor structure via an opening in a bottom of the rail, between the first and third attachment portions that are fastened to the rail, each deformable section may interact directly with the floor structure for enabling reliable energy absorbing operation of the seat mounting structure.

In some example embodiments, the first and third attachment portions are fastened to rail on opposite sides of the opening. Thereby, proper distribution of forces between the rail and floor structure is accomplished, thereby reducing material stress within the rail. Moreover, attachment of the deformable element to the rail is also simplified, because the first and third attachment portions are located sufficiently spaced apart for avoiding mutual interference.

In some example embodiments, the deformable element is made of sheet metal, and deformable section includes corrugated, undulated or curved sheet metal configured for enabling energy-absorbing deformation of the deformable section. This design enables a cost-efficient manufacturing of the deformable element, because sheet metal is generally associated with relatively low cost in terms of both material cost and manufacturing cost. Moreover, a deformable section made of corrugated, undulated or curved sheet metal generally provides a reliable and rather well defined behaviour during a deformation event.

In some example embodiments, the deformable element is specifically designed to undergo plastic deformation for controlled change of distance in the longitudinal direction of the rail in a range of 10-100 mm relative to the underlying floor structure in the event of a vehicle crash. Thereby, a significant deformation length may be provided for enabling corresponding reduction of seat longitudinal acceleration levels in the event of a vehicle collision.

In some example embodiments, the mounting structure comprises a vehicle passenger cabin floor structure and a fastening arrangement for fastening the second attachment portion of the deformable element to the vehicle passenger cabin floor structure, wherein the fastening arrangement includes a single threaded bolt or stud. Thereby, a cost-efficient and reliable attachment solution is provided.

In some example embodiments, the fastening arrangement only clamps the deformable element against the floor structure. In other words, the fastening arrangement does not clamp the rail directly, but merely indirectly via deformable element. Thereby, the rail is still relatively free to move upon deformation of the deformable element, without significant clamping friction otherwise caused if the single threaded bolt or stud would clamp the rail directly to the floor structure.

In some example embodiments, the second attachment portion of the deformable element includes a hole in the deformable element, and the single threaded bolt or stud extends through said hole. Thereby, a straightforward and reliable attachment of the deformable element to the floor structure is accomplished.

In some example embodiments, the vehicle passenger cabin floor structure includes a T-nut fastened to the vehicle passenger cabin floor structure, or a threaded hole is provided in the vehicle passenger cabin floor structure, or a nut is provided on an opposite side of the vehicle passenger cabin floor structure, for fastening of the energy absorbing mounting structure to the vehicle passenger cabin floor structure by means of the threaded bolt.

In some example embodiments, the fastening arrangement comprises a weld stud attached to the vehicle passenger cabin floor structure and a threaded nut is used for securing the deformable element to the weld stud.

In some example embodiments, the single threaded bolt or stud configured for fastening the deformable element to the floor structure may be provided with a conical end for simplifying mounting of the threaded bolt or stud in the floor structure.

In some example embodiments, the mounting structure further comprises at least one spacer arranged between the bottom of the rail and the floor structure for transmitting any load of driver or passenger located in seat associated with the mounting structure to the floor structure. Thereby, the deformable element does not need to be arranged to carry the vertical load of the seat, and may instead be designed solely for accomplishing a large energy absorbing deformation region. The vertical load of the seat may instead be transferred from the rails to the floor structure via the at least one spacer. The spacer may additionally be arranged to provide low sliding friction between the rail and floor structure for enabling reliable and well-defined energy absorbing levels in the event of a vehicle collision. Furthermore, the spacer may additionally, or alternatively, be arranged to enable a certain level of vertical motion of the rail with respect to the floor structure, for example by means of elastic deformation of the spacer, for providing improved vibration decoupling of the rail from the floor structure.

In some example embodiments, the mounting structure further comprises a first fastener for fastening the first attachment portion to the rail, which first fastener also serves as said spacer. Thereby, said first fastener may have dual functionality and thus enabling reduced overall weight.

In some example embodiments, the rail is not attached to floor structure at any of first and third attachment portions. In other words, the rail can move relative to the floor structure at said first and third attachment portions of the deformable element. Thereby, the deformation element may be properly deformed in the event of a vehicle collision for providing the desired energy absorbing effect.

In some example embodiments, the opening in the rail has a non-circular form that becomes increasingly narrow along the longitudinal direction of the rail for providing increasing interference with the fastening arrangement upon relative motion between the floor structure and the rail in a longitudinal direction of the rail in the event of a vehicle crash. Thereby, not only will deformation of the deformable element result in energy absorption during a vehicle collision, but also deformation of the rail itself upon interference with the fastening arrangement. As a result, the energy-absorbing characteristic of the mounting structure may be better adapted to each specific implementation. For example, the energy-absorbing characteristic may be arranged to have a more exponential character.

In some example embodiments, the opening in the rail has a form that enables a first phase of relative motion involving deformation of the deformable element without interference between the fastening arrangement and rail, and that the opening in the rail has a form that enables a second phase of relative motion involving deformation of the deformable element and deformation of the rail adjacent the opening due to interference between the fastening arrangement and the rail. As a result, the energy-absorbing characteristic of the mounting structure may be better adapted to each specific implementation. For example, the energy-absorbing characteristic may be arranged to have a more exponential character.

In some example embodiments, the energy absorbing mounting structure further comprises a seat position adjustment arrangement including an elongated attachment bracket that is configured to be slidingly arranged, and connected to, the rail, for enabling seat position adjustment in a longitudinal direction relative to the rail.

In some example embodiments, the energy absorbing mounting structure further comprises a vehicle seat, wherein the elongated attachment bracket is fastened to an underside of the seat and rollingly supported by the rail via linear ball bearings for enabling adjustable seat position.

The disclosure also relates to a vehicle including the energy absorbing mounting structure for a vehicle seat according to the description above.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
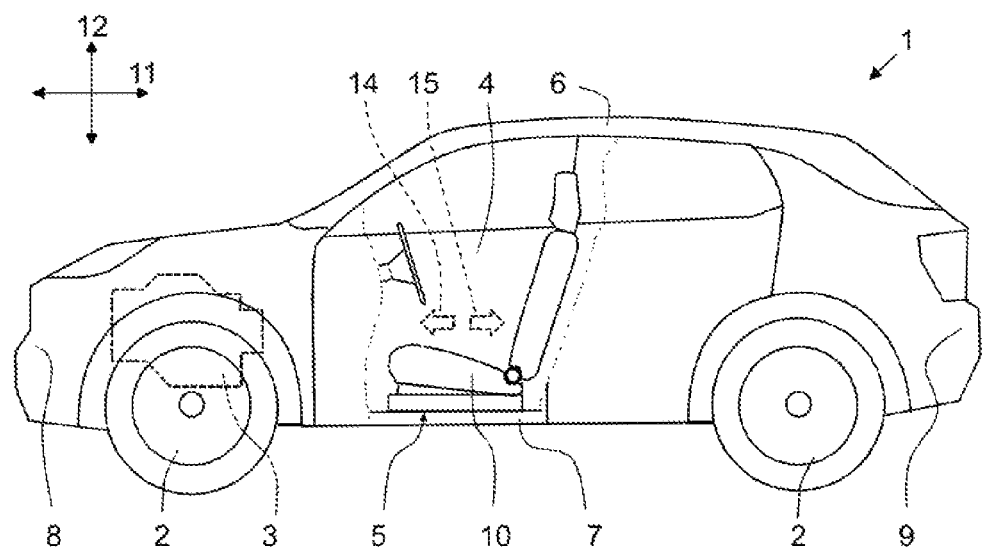
FIG. 1 shows schematically a side view of a car having a seat mounted by means of the energy absorbing mounting structure according to the disclosure.

FIG. 1 schematically shows a car 1 having a longitudinal direction 11, a vertical direction 12, a front 8, a rear 9, wheels 2, a propulsion source 3, a passenger cabin 4 with doors and windows and a roof 6 and a floor structure 7 and at least one vehicle seat 10, such as the driver's seat. The car 1 further has an energy absorbing mounting structure 5 for mounting of the vehicle seat 10 in the car 1.

The energy absorbing mounting structure 5 according to the disclosure is however not limited to the driver's seat but may be implemented at any seat of the vehicle 1.

Conventionally, the vehicle seat 10 is often rigidly mounted to the vehicle passenger cabin floor structure 7. However, with the use of new stronger and lighter materials in the vehicle chassis, such as composites and new high strength steels, the vehicle chassis does not necessarily absorb energy the same way as before in the event of a vehicle collision in a longitudinal direction 11, such as a front or rear impact.

Consequently, the seats 10 may be provided with more and more absorbing features in different locations to compensate for the reduced energy absorbing performance of the vehicle chassis. However, such absorbing features arranged at different locations of the seat 10 typically results increased overall cost.

The solution provided by the disclosure is provide an energy absorbing mounting structure 5 for the vehicle seat 10 that may take over the energy absorption functionality in many of the different load cases occurring during a vehicle collision. Specifically, by absorbing energy in the joint between the seat and the vehicle chassis, the seat itself may have a less sophisticated and complex design.

In the event of a vehicle front impact, for example caused by frontal collision with an object, the vehicle undergo rapid deceleration that may be harmful for vehicle a passenger sitting in the vehicle seat 10. Consequently, in such case it may be desirable to provide an energy absorbing mounting structure 5 of the seat 10 that allows the seat 10 to move slightly in the vehicle longitudinal direction 11 towards the front 8, as illustrated by arrow 14 in FIG. 1, while absorbing energy.

Similarly, in the event of a vehicle rear impact, for example caused by rear collision with an object, the vehicle typically undergo rapid acceleration that may be harmful for vehicle a passenger sitting in the vehicle seat 10. Consequently, in such case it may be desirable to provide an energy absorbing mounting structure 5 of the seat 10 that allows the seat 10 to move slightly in the vehicle longitudinal direction 11 towards the rear 9, as illustrated by arrow 15 in FIG. 1, while absorbing energy.

Figure 2:
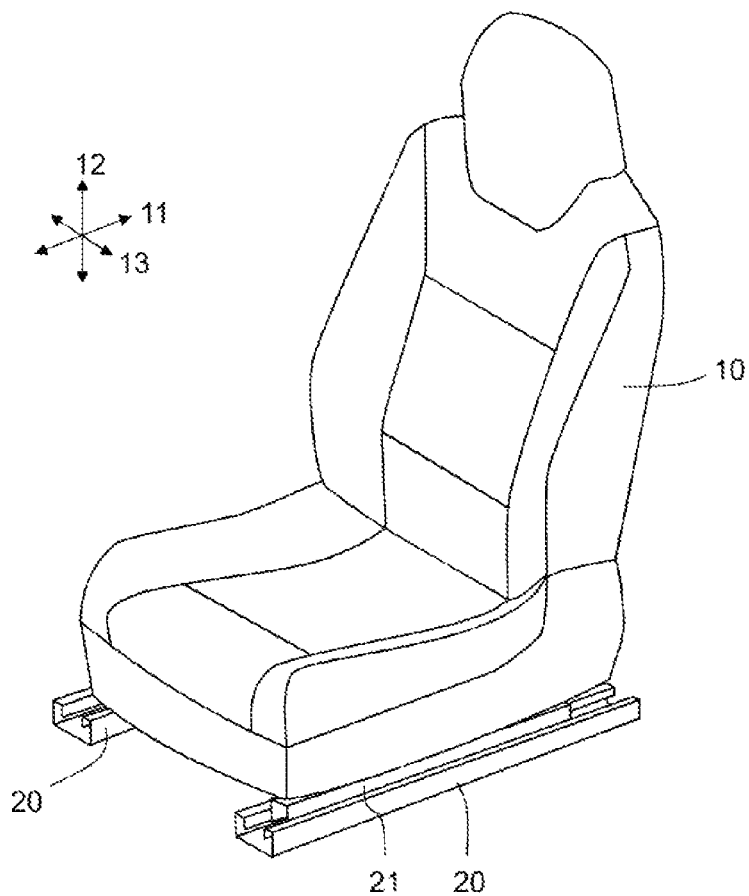
FIG. 2 shows schematically the seat of FIG. 1.

With reference to FIG. 2, the attachment of the seat 10 to the floor structure 5 is accomplished by means of two rails 20 that are arranged side-by-side, as seen in a lateral direction 13 of the vehicle, and extending in the longitudinal direction 11 of the vehicle. Attachment of vehicle seat to the floor structure by means of two parallel rails, albeit rigidly, is a conventional solution. Hence, by using the two rails also for this new attachment structure, the overall cost for may be kept low.

The seat 10 typically includes some type of seat position adjustment arrangement for enabling seat position adjustment in the longitudinal direction 11 relative to the rails 20. For example, the seat position adjustment arrangement may include two elongated attachment brackets 21, or the like, that are configured to be slidingly arranged, and connected to, the rails 20.

Figure 3:
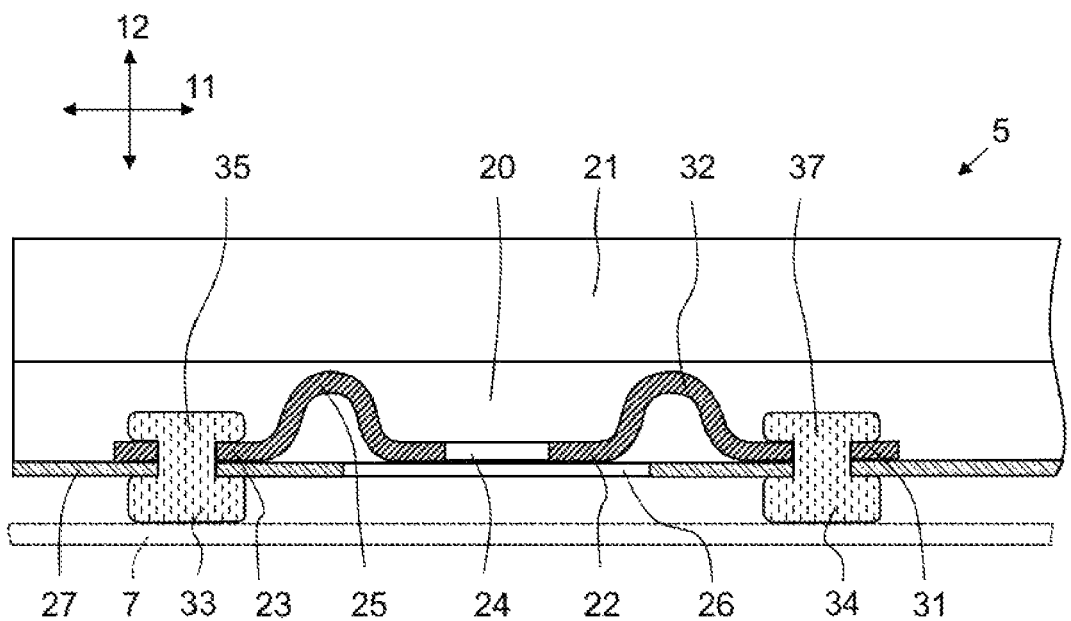
FIG. 3 shows schematically a side view of a first example embodiment of the energy absorbing mounting structure according to another embodiment of the disclosure.

A side view of a first example embodiment of the energy absorbing mounting structure for a vehicle seat is schematically illustrated in FIG. 3. The energy absorbing mounting structure 5 comprises a linear rail 20 configured for being fastened to a vehicle passenger cabin floor structure 7 and a deformable element 22. The deformable element 22 has a first attachment portion 23, a second attachment portion 24 and a deformable section 25 arranged between the first and second attachment portions 23, 24. Moreover, the first attachment portion 23 is fastened to the rail 20 and the second attachment portion 24 is configured for being fastened to the vehicle passenger cabin floor structure 7 via an opening 26 in a bottom 27 of the rail 20 for enabling relative motion between the floor structure 7 and the rail 20 in a longitudinal direction 11 of the rail 20 by deformation of the deformable section 25 in the event of a vehicle crash.

Figure 4:
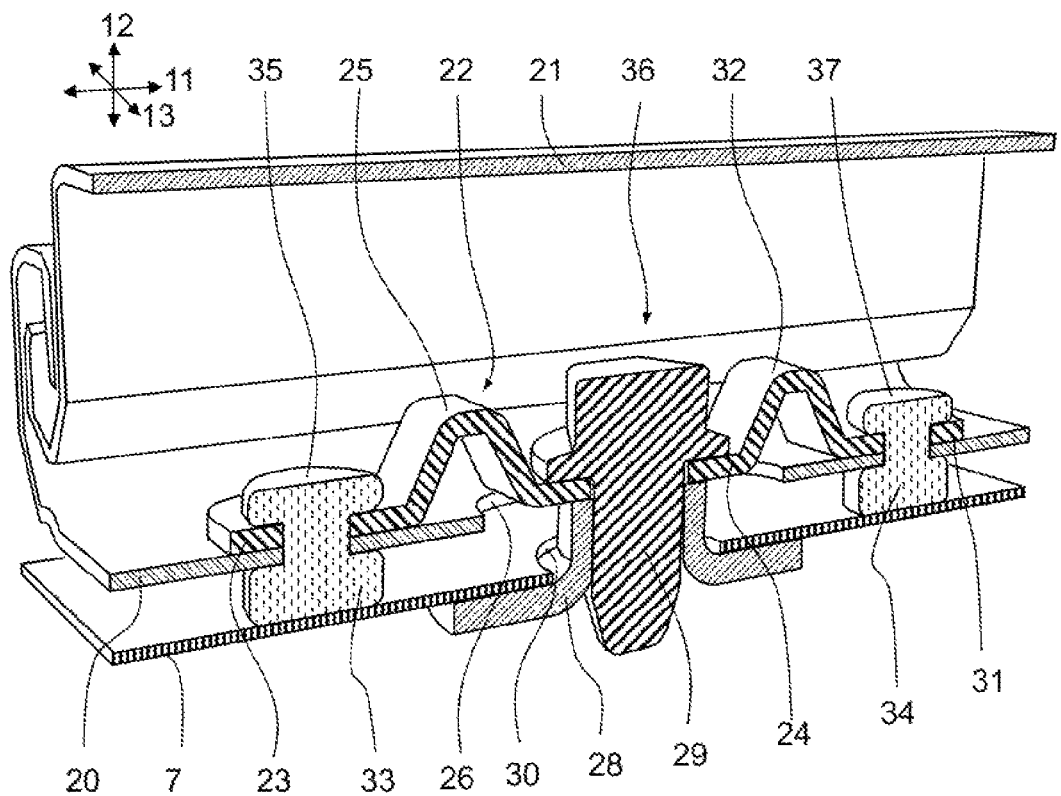
FIG. 4 shows schematically a 3D view the energy absorbing mounting structure of FIG. 3 in a mounted state.

FIG. 4 shows a perspective view of the first example embodiment of the energy absorbing mounting structure 5, and illustrated with a cross-section extending in a centre of the mounting structure 5 and in a vertical plane and parallel with the longitudinal direction 11. The energy absorbing mounting structure 5 of FIG. 2 is also here illustrated connected with the underlying floor structure 7.

In the example embodiment of FIG. 4, the floor structure 7 includes a T-nut 28 that is fastened to the floor structure 7 for enabling fastening of the energy absorbing mounting structure 5 thereto.

The T-nut 28 has a flange portion and a sleeve portion, wherein the flange portion may be used for fastening the T-nut to the floor structure 7, and the sleeve portion may be provided with interior threads for receiving a threaded fastener 29. The T-nut may be attached to the floor structure 7 at a hole 30 in the floor structure 7 for enabling the sleeve portion and/or the fastener to extend through the hole 30. The T-nut may for example be a weld nut, a river t-nut, or the like. Alternatively, the threaded fastener may threadingly engage threads provided directly in the interior hole 30 in the floor structure 7, or a nut may be provided on the opposite side of the floor structure 7.

The vehicle passenger cabin floor structure 7 may for example have a generally flat structure, as schematically illustrated in FIGS. 3 and 4. However, many other shapes and geometries are of course possible. The passenger cabin floor structure 7 is simply referring to the underlying floor structure that is located below the seat and which is part of the vehicle chassis or a part that is non-movably and permanently attached to the vehicle chassis.

Although the deformable element 22 indeed may have only one deformable section 25, as illustrated in an example embodiment further down, the deformable element 22 illustrated on FIGS. 3 and 4 additionally has a third attachment portion 31 and a further deformable section 32 arranged between the second and third attachment portions 24 31, wherein the third attachment portion 31 is fastened to the rail 20.

The definition that the deformable section 25 being arranged between the first and second attachment portions, and that the further deformable section 32 is arranged between the second and third attachment portions 24 31, is primarily intended to describe a functional relationship, and not necessary a physical relative arrangement, even if this is illustrated in the example embodiment of FIGS. 3 and 4. In other words, the deformable element 22 may alternatively have a form in which the second portion 24 is arranged between the first portion 23 and the deformable section 25 in terms of their physical relative arrangement. The same applies to the further deformable section 32 and its relative position to the second and third attachment portions 24, 31.

When the deformable element has two deformation sections 25, 32 and first-third attachment portions 23, 24, 31, as illustrated in the example embodiment of FIGS. 3 and 4, the first and third attachment portions may be fastened to rail on opposite sides of the opening 26, as seen in the longitudinal direction 11 of the rail 20. Thereby, a good distribution of forces is accomplished between the deformable element 22 and the rail 20, and the deformation of the two deformation sections 25, 32 may take place without undesirable mutual interference. This arrangement also enables fastening of the deformable element 22 to the rail 20 by means of a single fastener 29, such as the threaded fastener.

The deformable element 22 may for example be made of sheet metal, thereby enabling a cost-efficient manufacturing. Moreover, the deformable sections 25, 32 may in such case include a corrugated, undulated or curved sheet metal configured for enabling energy-absorbing deformation of the deformable section 25, 32.

The mounting structure 5 may comprise also the vehicle passenger cabin floor structure 7, and a fastening arrangement 36 for fastening the second attachment portion 24 of the deformable element 22 to the vehicle passenger cabin floor structure 7. In particular, the fastening arrangement 36 may include a single threaded bolt or stud 29.

For this reason, the second attachment portion 24 of the deformable element 22 includes a hole in the deformable element 22, and the single threaded bolt or stud extends through said hole, as shows in the example embodiment of FIGS. 3 and 4. In other words, the hole of the deformable element located at the second attachment portion 24 is overlapping the opening 26 of the rail 20 in assembled state of the energy absorbing mounting structure 5.

The aforementioned relative motion between the floor structure 7 and the rail 20 in a longitudinal direction 11 of the rail 20 is enabled by having the size of the opening 26 in the rail 20 larger than the size of the fastening arrangement 36 for fastening the second attachment portion to the vehicle passenger cabin floor structure, as seen in the longitudinal direction 11. In particular, by having the size of opening 26 in the rail 20 larger than the size of the threaded fastener 29 or T-nut 28. Thereby, the threaded fastener 29 and/or T-nut 28 may move relative to the opening 26 in the rail 20 in the longitudinal direction 11.

A further consequence of having the size of the opening 26 in the rail 20 larger than the size of the fastening arrangement 36 for fastening the second attachment portion to the vehicle passenger cabin floor structure is that said fastening arrangement 36 only tends to lamps the deformable element against the floor structure 7. In other words, the fastening arrangement 36 does not clamp or engage the rail directly, but merely indirectly via deformable element 22.

The energy absorbing mounting structure 5 further comprises at least one spacer 33, 34 arranged between the bottom of the rail 20 and the floor structure 7 for transmitting any load of driver or passenger located in seat associated with the mounting structure 5 to the floor structure 7. In fact, in the example embodiment of FIGS. 3 and 4, the energy absorbing mounting structure 5 comprises a first spacer 33 at the first attachment portion 23 and a second spacer 34 at the third attachment portion 31.

Since the first and second spacers 33, 34 are configured for transmitting any load of the driver or passenger located in seat 10 to the floor structure 7, the deformable element 22 may largely be relieved from handling said vertical load. Thereby, the deformable element 22 may be more specifically adapted for large energy absorbing capacity in the longitudinal direction 11.

According to some example embodiments, the deformable element 22 may be an integral portion of the rail 20. For example, the rail 20 may have one or more tongues stamped out in the bottom surface of the rail 20. For example, each tongue may have a rectangular shape and being cut-free from the bottom surface via the stamping operation along three sides of the tongue while one side of the tongue is un-cut from, i.e. still unified with, the bottom of the rail 20. A section of the tongue, corresponding to the future deformable section of the tongue, may subsequently be permanently deformed to include a corrugated, undulated or curved sheet metal that is configured for enabling energy-absorbing deformation of the deformable section. In such an embodiment, the first attachment portion of the deformable element corresponds to said one side of the tongue that is un-cut from, i.e. still unified with, the bottom of the rail 20. An advantage of this example embodiment is that less separate part need to be individually manufactured, handled and mounted together.

According to an alternative embodiment, as illustrated in FIGS. 3 and 4, the deformable element 22 is a separate part that is manufactured separately from the rail 20 and subsequently attached to the rail 20. This has the advantage of enabling manufacturing of the rail and deformable element in different materials specifically selected to the fit the desired function of each part. Hence, the deformable element may be selected from a material that is specifically suitable from energy absorption.

When the deformable element 22 is a separate part, it must be attached to the rail at the first attachment portion. This may be performed by means of a fastener, such as a threaded fastener, a rivet, an elastic and/or elastomeric pin or grommet, or the like, or by means of welding, forging, etc. However, as illustrated in FIGS. 3 and 4, in some example embodiments, the energy absorbing mounting structure comprises a first fastener 35 for fastening the first attachment portion 23 to the rail 20, wherein said first fastener 23 also serves as said first spacer 33. Thereby, the first fastener has dual functionality.

With reference to FIGS. 3 and 4, when the deformable element has also a third attachment portion 31, the energy absorbing mounting structure further comprises a second fastener 37 for fastening the third attachment portion 31 to the rail 20, wherein said second fastener 37 also serves as said second spacer 34.

Figure 5:
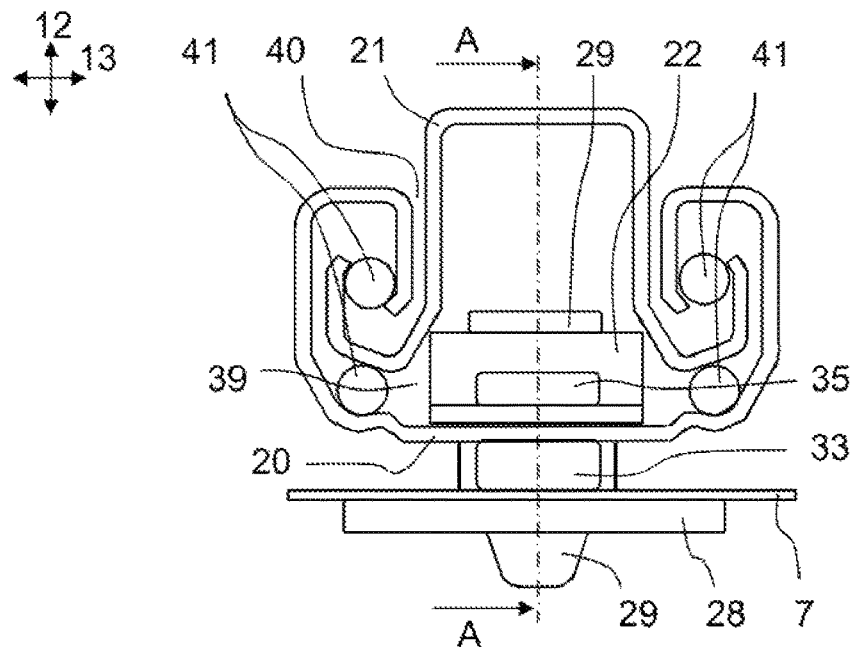
FIG. 5 shows schematically a side view of an example embodiment of the energy absorbing mounting structure.

FIG. 5 shows a side-view of an example embodiment of the energy absorbing mounting structure 5 in an attached state, as seen in a longitudinal direction 11. FIG. 7A shows a side view of the energy absorbing mounting structure 5 illustrated with a cross-section extending along cut A-A in FIG. 5, a and FIG. 6 shows a section of the same energy absorbing mounting structure 5 in an attached state along cut C-C in FIG. 7A.

Figure 6:
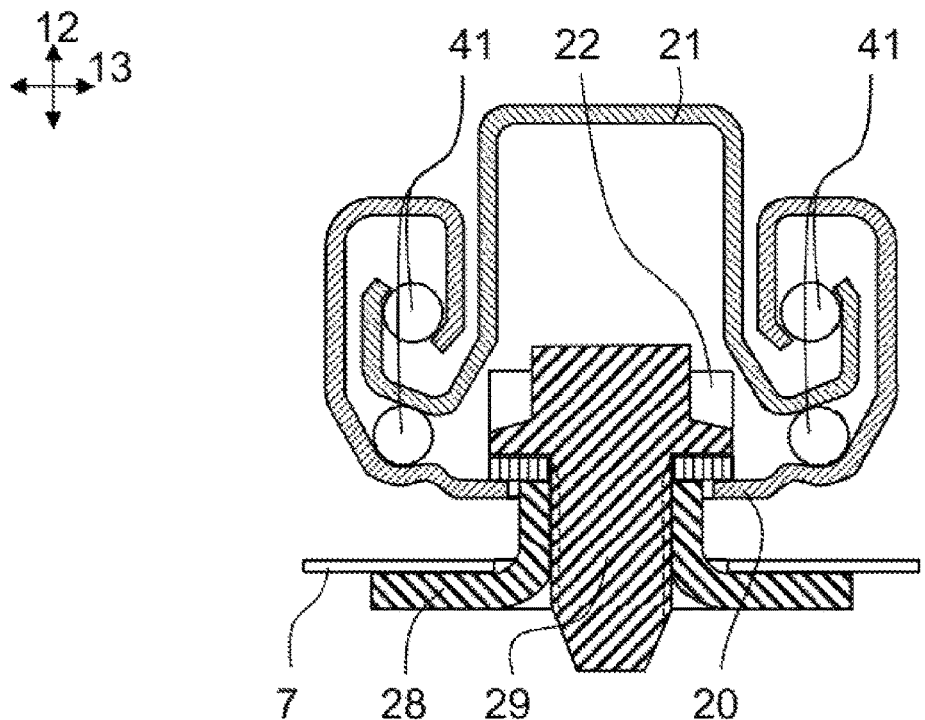
FIG. 6 shows schematically a cross-section of the energy absorbing mounting structure at cut C-C.
Figure 7A:
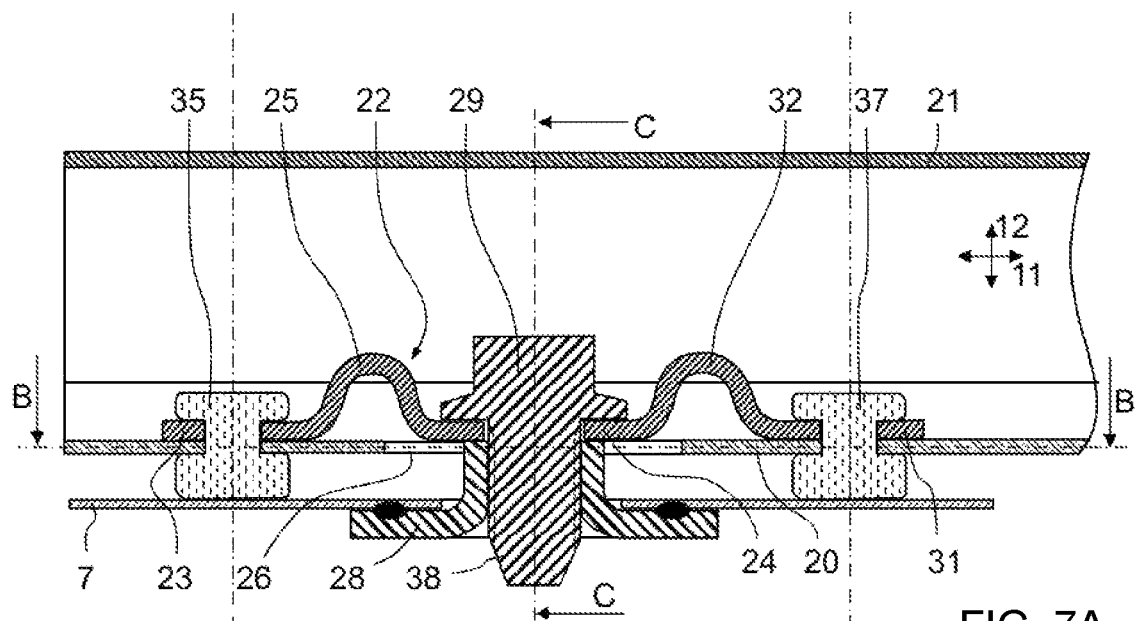
FIG. 7A shows schematically a cross-section of the energy absorbing mounting structure at cut A-A.

With reference to FIG. 5 and FIG. 6, the rail 20 has a generally U-shaped cross-sectional profile with a hollow interior recess 39 being accessible via an upwards facing opening 40 extending along the longitudinal direction 11 of the rail 20, wherein the deformable element 22 is located in said hollow interior recess 39. In fact, the first attachment portion 23 of the deformable element 22 is fastened to an interior bottom surface of the rail 20. Consequently, the deformable element 22 is located within the rail 20, i.e. substantially surrounded and encapsulated by the rail walls, thereby providing the deformable element 22 with good protection against undesired interference, and additionally a compact overall design of the energy absorbing mounting structure 5.

The elongated attachment bracket or rail 21 that is fastened to the underside of the seat 10 and that is configured to be slidingly arranged, relative to the rails 20 for enabling adjustable seat position, may be rollingly supported by the rail 20, for example via linear ball bearings, as illustrated by rollers 41.

Figure 7B:
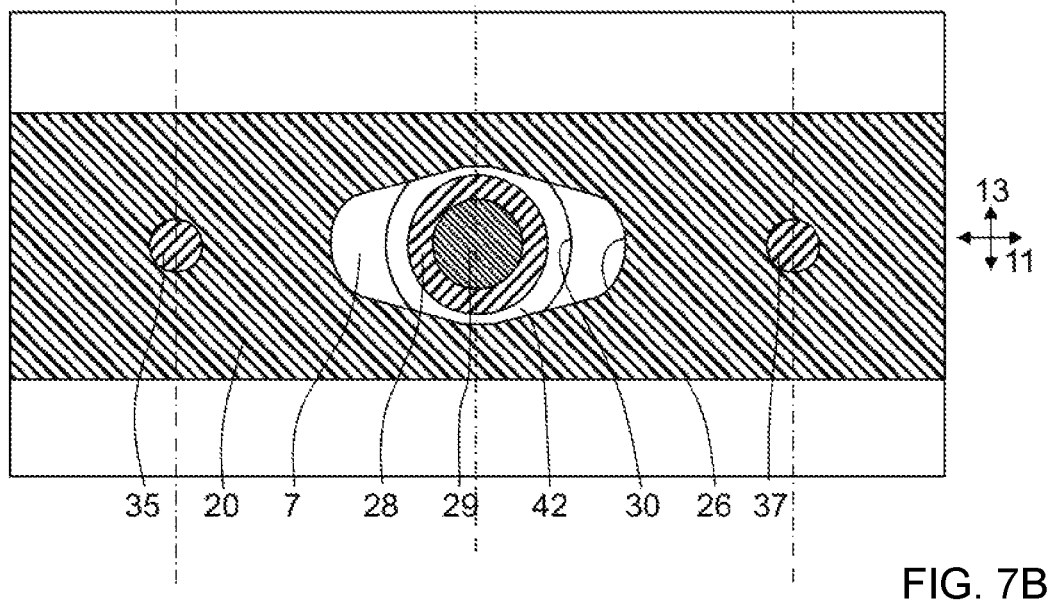
FIG. 7B shows schematically a cross-section of the energy absorbing mounting structure at cut B-B.
Figure 8A:
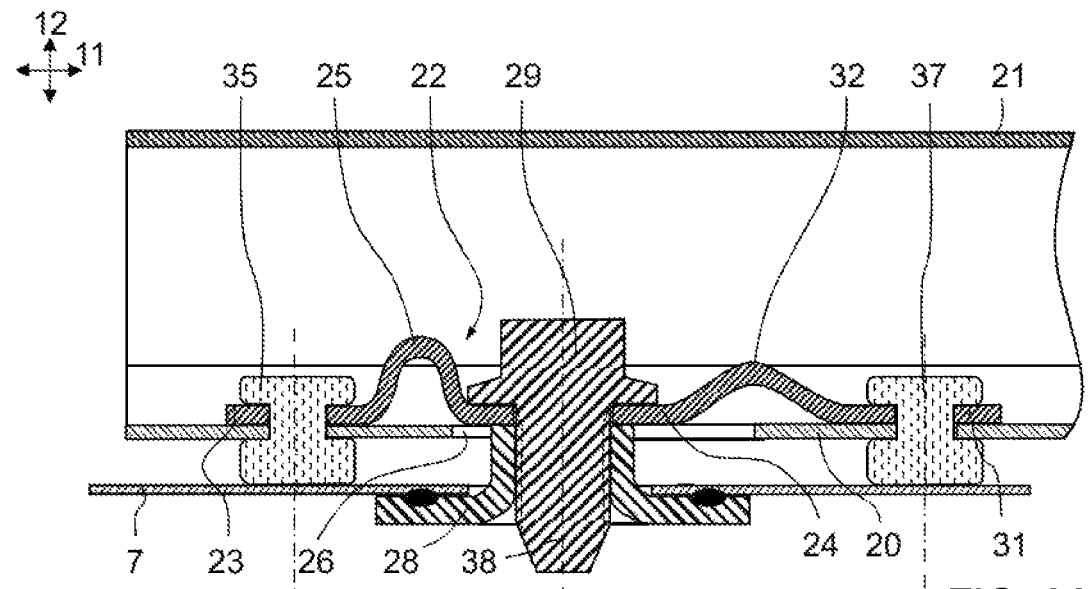
FIG. 8A-8B shows schematically two sections of the energy absorbing mounting structure in a deformed state.
Figure 8B:
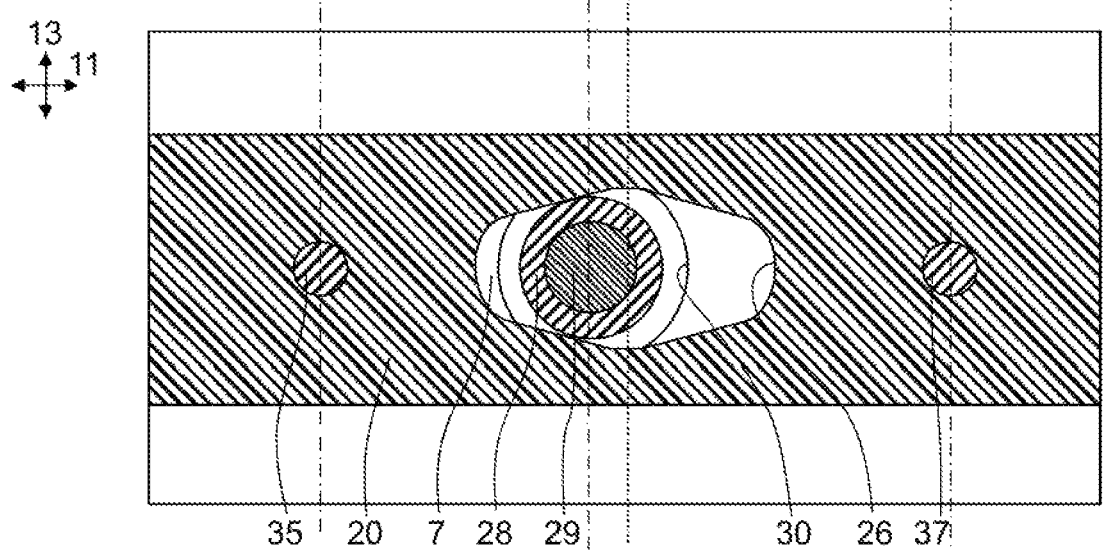

FIG. 7A shows a cross-sectional side view of the energy absorbing mounting structure 5 and FIG. 7B shows a top view of the energy absorbing mounting structure 5 illustrated with a cross-section extending along cut B-B in FIG. 7A. In other words, FIGS. 7A and 7B shows the same energy absorbing mounting structure 5 and in the same state. Similarly, FIGS. 8A and 8B show corresponding views as FIGS. 7A and 7B, but at a later stage during a deformation event, and FIGS. 9A and 9B also show corresponding views as FIGS. 7A and 7B, but at a yet later stage during a deformation event.

With reference to FIG. 7A, the energy absorbing mounting structure 5 of FIG. 2 is here illustrated connected with the underlying floor structure 7 via the single threaded fastener 29 and associated T-nut 28, which here is welded to the underside of the floor structure 7.

The single threaded bolt or stud 29 configured for fastening the deformable element 22 to the floor structure 7 may be provided with a conical end 38 for simplifying mounting of the threaded bolt or stud 29 in the floor structure 7.

In other words, when mounting the rail 20 and deformable element 22 to the floor structure 7, the rail 20 and deformable element 22 may first be connected at the first attachment portion 23, thereafter the rail 20 and deformable element 22 unit may be positioned on the floor structure 7 and the threaded bolt or stud 29 may be inserted into the hole at the second attachment portion 24, and through the opening 26 of the rail 20, and into the upper opening of the T-nut 28. Having the threaded bolt or stud 29 being provided with a conical end 38, insertion of the threaded bolt or stud 29 into said hole, opening and T-nut is clearly simplified due to the auto-alignment provided by the conical end.

With reference to FIG. 7B, the opening 26 in the rail 22 has a non-circular form and becomes increasingly narrow along the longitudinal direction 11 of the rail 20 for providing increasing interference with the fastening arrangement 36 upon relative motion between the floor structure and the rail in a longitudinal direction of the rail in the event of a vehicle crash. In other words, depending on the size and shape of the fastening arrangement 36, such as a threaded fastener 29 or T-nut 28, and the size and shape of the opening 26 in the rail 20, a planned interference between the fastening arrangement 36 and opening 26 may be configured to occur at a desired operating state of energy absorbing mounting structure.

For example, as illustrated in FIG. 7B, there may exist an air gap 42 between the fastening arrangement 36 and opening 26 at an initial operating state of energy absorbing mounting structure, i.e. before any deformation of the deformable 22 has occurred, and thus corresponding to an assembly state of the energy absorbing mounting structure 5. The air gap 42 is configured to enable the fastening arrangement 36 to move a certain distance relative to the opening 26 before said planned interference between the fastening arrangement 36 and opening 26 is triggered to start.

FIGS. 8A and 8B shows an operating state of the energy absorbing mounting structure 5 in which the fastening arrangement 36 has moved a distance 43 corresponding to said air gap 42, for example during a vehicle collision event. During this first phase of relative motion, only the deformable element 22 undergoes deformation. Hence, there is no interference between the fastening arrangement 36 and rail 20.

Figure 9A:
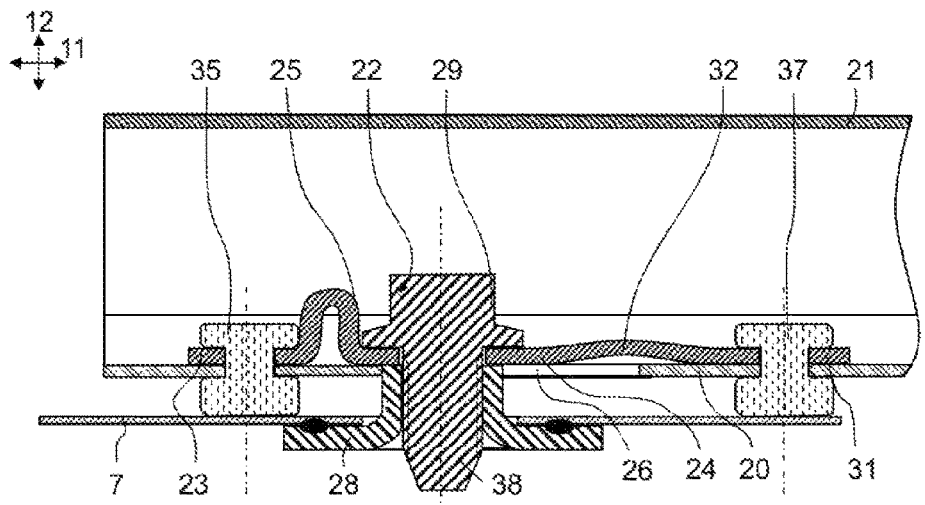
FIG. 9A-9B shows schematically two sections of the energy absorbing mounting structure in a further deformed state.
Figure 9B:
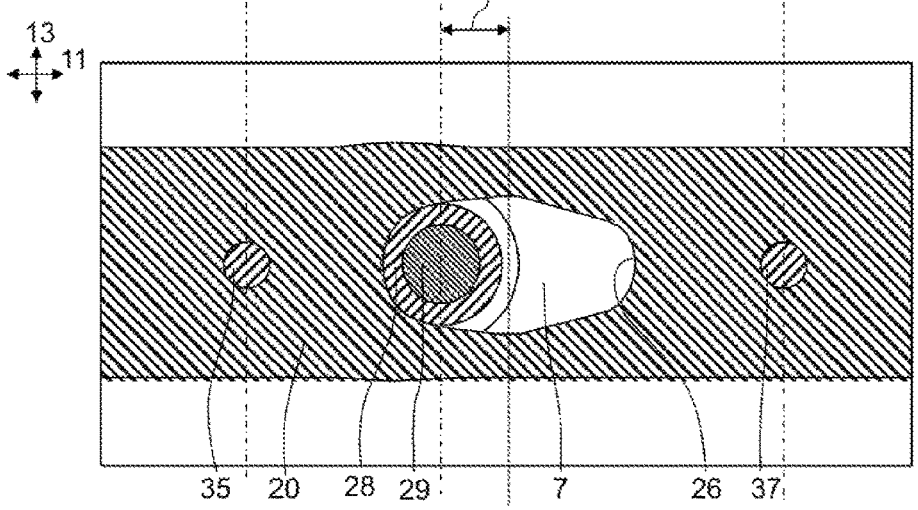

FIGS. 9A and 9B shows a subsequent operating state of the energy absorbing mounting structure 5 in which the fastening arrangement 36 has moved a longer distance 43, thus corresponding to a later state of said collision event. During the second phase of relative motion, there is an increasing level of interference between the fastening arrangement 36 and rail 20, in combination ongoing further deformation of the deformable element 22. The rate of energy absorption level of the energy absorbing mounting structure 5 is thus significantly increased during said second phase.

The opening 26 in the rail 20 may thus have a form that enables a first phase of relative motion involving deformation of the deformable element 22 without interference between the fastening arrangement 36 and rail 20, and a second phase of relative motion involving deformation of the deformable element 22 and deformation of the rail 20 adjacent the opening 26 due to interference between the fastening arrangement 36 and the rail 20.

This operating behaviour of the energy absorbing mounting structure 5 may be desirable because it enables an exponential and/or non-linearly increase in deformation force relative to longitudinal motion of the rail 20, thereby effectively causing a corresponding exponential and/or non-linearly increase in energy absorption rate of the of the energy absorbing mounting structure 5, that may be desirable in certain implementations.

Figure 10:
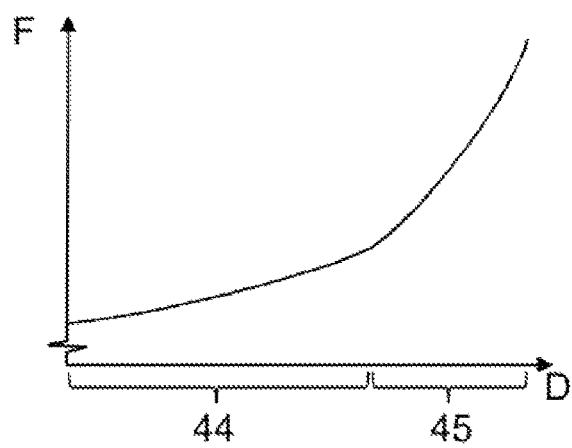
FIG. 10 shows an example of a deformation force as a function of relative displacement of the energy absorbing mounting structure.

Such an exponential and/or non-linearly increase in deformation force (F) relative to longitudinal motion (D) of the rail 20 is schematically illustrated in FIG. 10, which shows a first phase 44 and a second phase 45 of relative motion between the fastening arrangement 36 and opening 26.

It is further interesting to note that one of the deformable sections 25 becomes compressed during relative motion between the fastening arrangement 36 and opening 26, while the other of the deformable sections 32 becomes extended. It is thus possibly to configure the energy absorbing mounting structure 5 to have different behaviour depending on the direction of relative motion. In other words, the energy absorbing mounting structure 5 may be configured to provide different energy absorbing characteristic during a vehicle front impact and rear impact. This may be accomplished by suitable design of the deformable sections 25, 32 of the deformable element, but also by suitable design of the opening 26. Hence, the opening 26 may have a non-symmetrical shape with respect to a centre line extending in the lateral direction 13.

According to some example embodiments, the deformable element 22 may be specifically designed to undergo plastic deformation for controlled change of distance 43 in the longitudinal direction of the rail in a range of 10-100 mm relative to the underlying floor structure 7 in the event of a vehicle crash.

Figure 11:
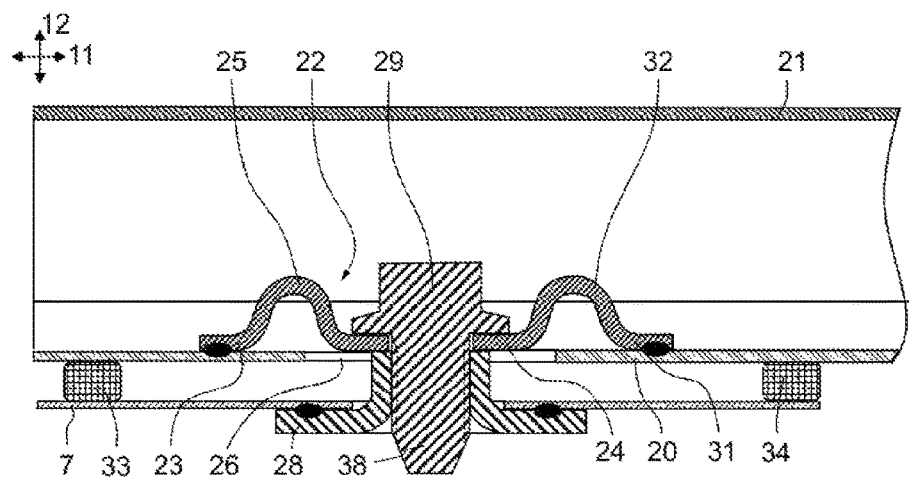
FIG. 11 shows schematically a side view of a further example embodiment of the energy absorbing mounting structure.

The energy absorbing mounting structure 5 according to the disclosure may have various different and alternative configurations and designs. One non-limiting example of an alternative design is shown in FIG. 11, in which the deformable element 22 is welded to the rail at the first and third attachment portions 23, 31. Moreover, the first and second spacers 33, 34 may be separate parts, or a single part.

Figure 12A:
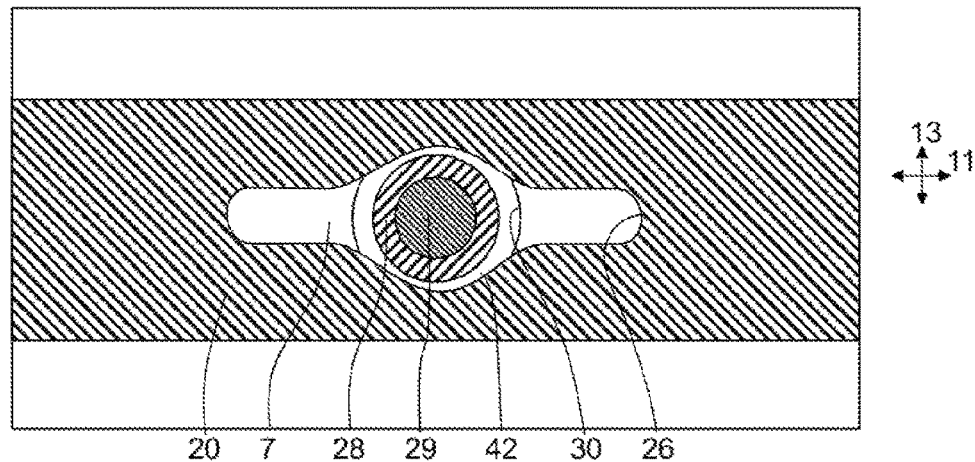
FIG. 12A-12B show schematically the state and relative displacement of the fastening arrangement and rail before and after an energy absorbing event.
Figure 12B:
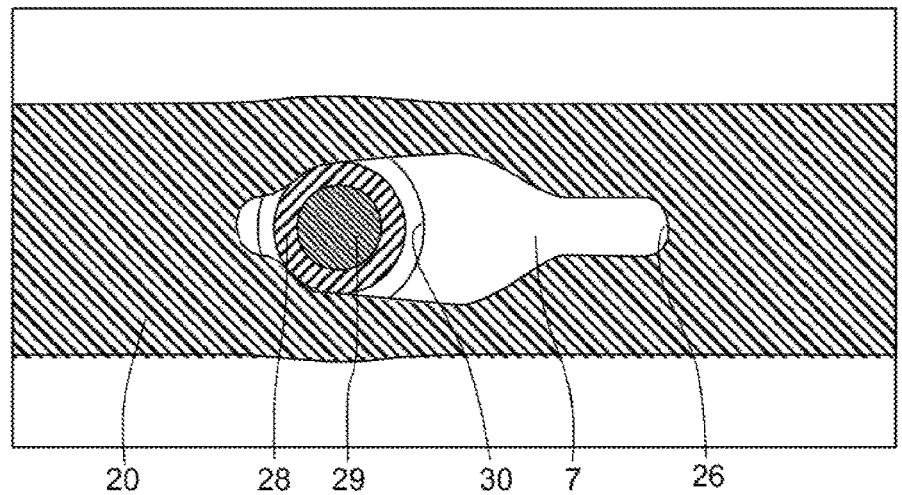

A further non-limiting example of an alternative design of the opening 26 is shown in FIGS. 12A and 12B, which show the energy absorbing mounting structure 5 in the initial state and end state of a relative motion of the fastening arrangement 36 and opening 26, respectively. In this example embodiment, the opening 26 may have a larger amount of interference between the fastening arrangement 36 and rail 20 during a collision event, thereby possibly generating increased energy absorbing capacity.

Figure 13:
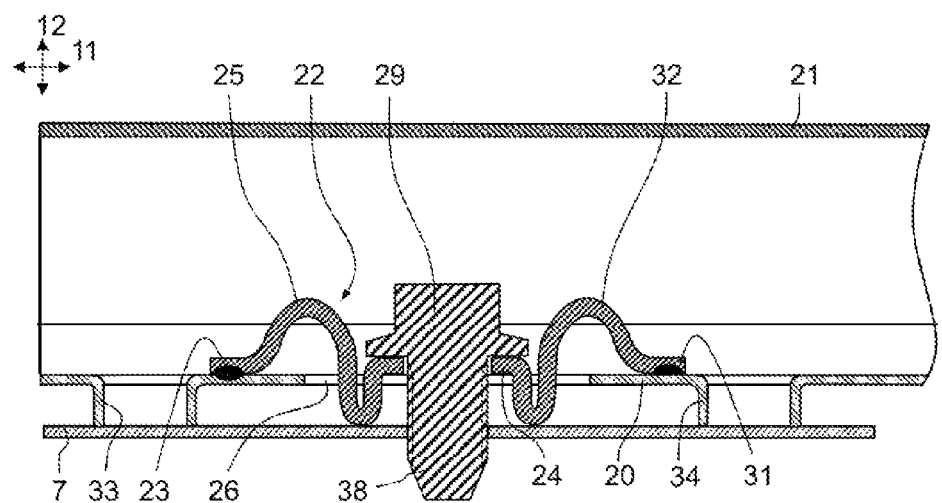
FIG. 13 shows schematically a side view of a further example embodiment of the energy absorbing mounting structure.

Still a further non-limiting example of an alternative design is shown in FIG. 13, in which the T-nut is omitted and the threaded fastener is attached directly to the floor structure 7, for example via self-tapping threaded fasteners, or by means of a nut arranged on the opposite side of the floor structure 7. Moreover, the offset previously provided by the T-nut may be replaced by a suitable shape of the deformable element 22. Finally, the first and second spacers 33, 34 may be formed integrally in the bottom of the rail 20, for example as convex protrusions and cutouts.

Figure 14:
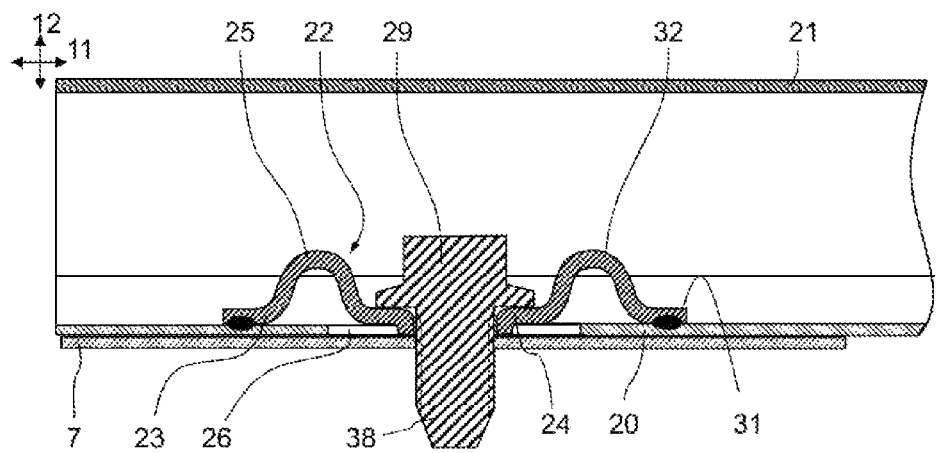
FIG. 14 shows schematically a side view of still a further example embodiment of the energy absorbing mounting structure.

Still a further non-limiting example of an alternative design is shown in FIG. 14, in which the spacers are omitted and the rail is configured to slide directly on the underlying floor structure 7.

Figure 15:
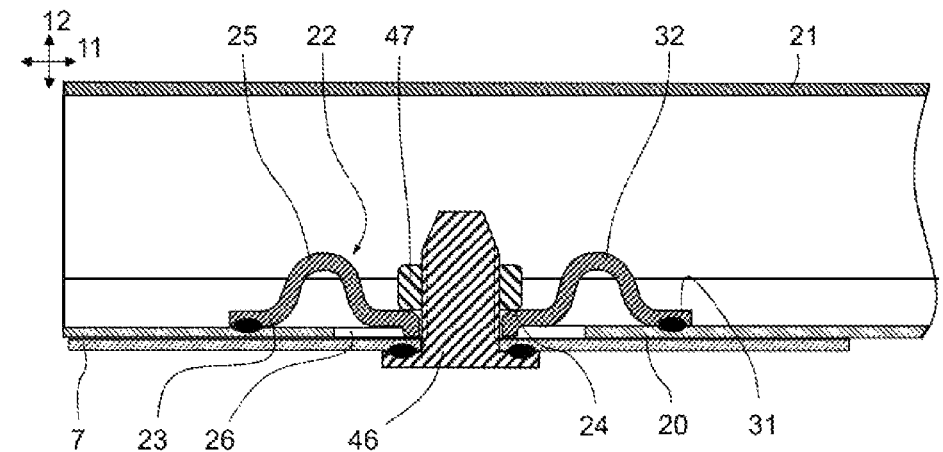
FIG. 15 shows schematically a side view of still another example embodiment of the energy absorbing mounting structure.

Still a further non-limiting example of an alternative design is shown in FIG. 15, in which the fastening arrangement 36 comprises a weld stud 46 attached to the underlying floor structure 7 and a threaded nut 47 is used for securing the deformable element 22 to the weld stud.

Figure 16:
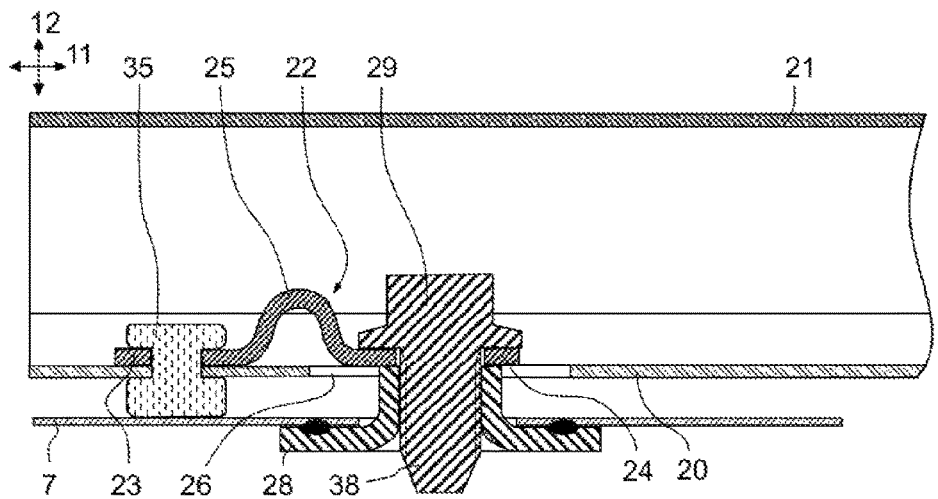
FIG. 16 shows schematically a side view of still a further example embodiment of the energy absorbing mounting structure.

A final non-limiting example of an alternative design is shown in FIG. 16, in which the deformable element merely has a single deformable section 25. This configuration of the energy absorbing mounting structure 5 may preferably, but not exclusively, be arranged such that the deformable section 25 undergo expansion during a collision event, because thereby the energy absorbing mounting structure 5 deforms in a more controlled manner.

Figure 17:
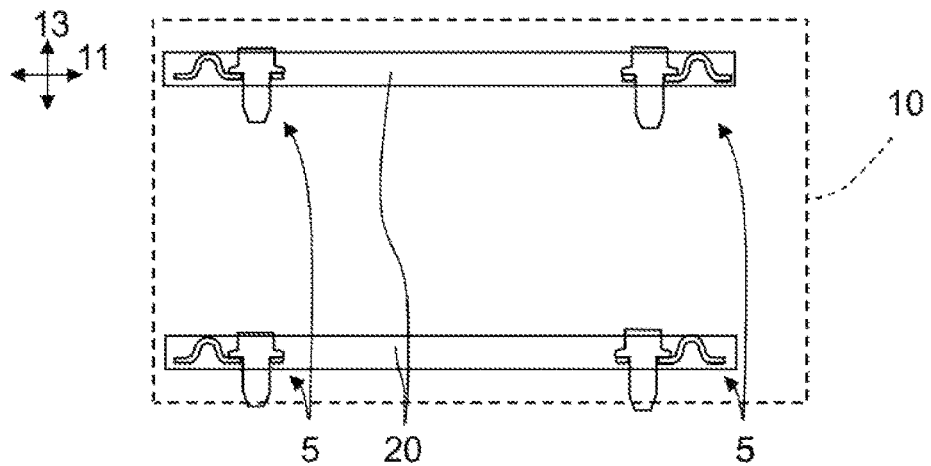
FIG. 17 shows schematically a top view of two rails of a seat mounted to a floor structure via four energy absorbing mounting structures.

With reference to FIG. 17 that shows a schematic top view of a vehicle seat mounting, each of the two parallel rails 20 extending in the longitudinal direction 11 under the seat may for example be secured to the underlying floor structure 7 with two energy absorbing mounting structures 5, one arranged at each end region of the rail 20. Such a fastening arrangement of the seat may for example be accomplished with energy absorbing mounting structures 5 as described with reference to FIG. 16, wherein the two energy absorbing mounting structures 5 arranged at the rear side of the seat may be arranged to absorb energy in the event of vehicle front impact, and the two energy absorbing mounting structures 5 arranged at the front side of the seat may be arranged to absorb energy in the event of vehicle rear impact.

Figure 18:
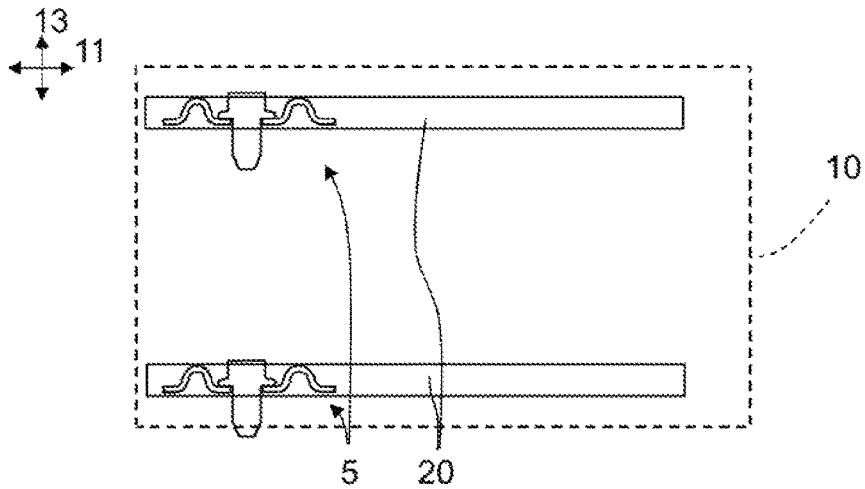
FIG. 18 shows schematically a top view of two rails of a seat mounted to a floor structure via two energy absorbing mounting structures.

Alternatively, with reference to FIG. 18, each of the two parallel rails 20 extending in the longitudinal direction 11 under the seat may for example be secured to the underlying floor structure 7 with a single energy absorbing mounting structure 5, which then however may be configured for efficient energy absorption both in the event of front and rear vehicle impact, such as for example shown with reference to FIGS. 3 and 4.

The scope of the disclosure is not limited to the specific example embodiments of the described energy absorbing mounting structure 5, but may be varied within the scope of the appended claims. Hence, various individual features of the described example embodiments may be combined into new example embodiments.

Figure 19:
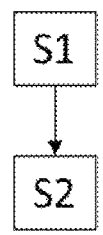
FIG. 19 shows schematically the basic steps of a method for providing an energy absorbing mounting of a vehicle seat.

The disclosure also relates to a method for providing an energy absorbing mounting 5 of a vehicle seat 10 enabling relative motion between the floor structure 7 of the vehicle and the seat rail 20 in a longitudinal direction 11 of the vehicle while absorbing energy by deformation of a deformable element 22 in the event of a vehicle crash. The basic steps of the method are described below with reference to FIG. 19, in which a first step S1 involves providing a linear rail 20 and a deformable element 22, wherein the deformable element 22 has a first attachment portion 23, a second attachment portion 24 and a deformable section 25 arranged between the first and second attachment portions 23, 24, and wherein the first attachment portion 23 is fastened to the rail 20. The method further comprises a second step S2 of fastening the second attachment portion 24 to the vehicle passenger cabin floor structure 7 via an opening 26 in a bottom of the rail 20, and a third step S3 of fastening of the vehicle seat 10 to the rail 20.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. For example, the order of the steps of the described method may be altered, specifically with respect to the order of the following steps: attachment of the first attachment portion 23 to the rail 20, fastening the second attachment portion 24 to the vehicle passenger cabin floor structure 7, and fastening the vehicle seat 10 to the rail 20.

It is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

What is claimed is:

1. An energy absorbing mounting structure for a vehicle seat, the mounting structure comprising:
   a linear rail configured for being fastened to a vehicle passenger cabin floor structure,
   a deformable element, and
   a seat position adjustment arrangement including an elongated attachment bracket that is configured to be slidingly arranged, and connected to, the rail, for enabling seat position adjustment in a longitudinal direction relative to the rail,
   wherein the deformable element has a first attachment portion, a second attachment portion and a deformable section arranged between the first and second attachment portions,
   wherein the first attachment portion is fastened to the rail and the second attachment portion is configured for being fastened to the vehicle passenger cabin floor structure via an opening in a bottom of the rail for enabling relative motion between the floor structure and the rail in a longitudinal direction of the rail by deformation of the deformable section in the event of a vehicle crash, and
   wherein the rail has a generally U-shaped cross-sectional profile with a hollow interior recess being accessible via an upwards facing opening extending along the longitudinal direction of the rail, wherein the deformable element is located in the hollow interior recess.

2. The energy absorbing mounting structure according to claim 1, wherein the deformable element has a third attachment portion and a further deformable section arranged between the second and third attachment portions, and the third attachment portion is fastened to the rail.

3. The energy absorbing mounting structure according to claim 2, wherein the first and third attachment portions are fastened to the rail on opposite sides of the opening.

4. The energy absorbing mounting structure according to claim 1, wherein the deformable element is made of sheet metal, and the deformable section includes corrugated, undulated or curved sheet metal configured for enabling energy-absorbing deformation of the deformable section.

5. The energy absorbing mounting structure according to claim 1, wherein the deformable element is specifically designed to undergo plastic deformation for controlled change of distance in the longitudinal direction of the rail in a range of 10-100 mm relative to the underlying floor structure in the event of a vehicle crash.

6. The energy absorbing mounting structure according to claim 1, wherein the energy absorbing mounting structure comprises the vehicle passenger cabin floor structure and a fastening arrangement for fastening the second attachment portion of the deformable element to the vehicle passenger cabin floor structure, wherein the fastening arrangement includes a single threaded bolt or stud.

7. The energy absorbing mounting structure according to claim 6, wherein the second attachment portion of the deformable element includes a hole in the deformable element, and the single threaded bolt or stud extends through said hole.

8. The energy absorbing mounting structure according to claim 6, wherein the vehicle passenger cabin floor structure includes a T-nut fastened to the vehicle passenger cabin floor structure.

9. The energy absorbing mounting structure according to claim 6, wherein the opening in the rail has a form that enables a first phase of relative motion involving deformation of the deformable element without interference between the fastening arrangement and rail, and wherein the opening in the rail has a form that enables a second phase of relative motion involving deformation of the deformable element and deformation of the rail adjacent the opening due to interference between the fastening arrangement and the rail.

10. The energy absorbing mounting structure according to claim 6, wherein a threaded hole is provided in the vehicle passenger cabin floor structure.

11. The energy absorbing mounting structure according to claim 6, wherein a nut is provided on an opposite side of the vehicle passenger cabin floor structure, for fastening of the energy absorbing mounting structure to the vehicle passenger cabin floor structure by means of the threaded bolt.

12. The energy absorbing mounting structure according to claim 6, wherein the fastening arrangement comprises a weld stud attached to the vehicle passenger cabin floor structure and a threaded nut is used for securing the deformable element to the weld stud.

13. The energy absorbing mounting structure according to claim 1, wherein the energy absorbing mounting structure further comprises at least one spacer arranged between the bottom of the rail and the floor structure for transmitting any load of driver or passenger located in the seat associated with the mounting structure to the floor structure.

14. The energy absorbing mounting structure according to claim 13, wherein the energy absorbing mounting structure further comprises a first fastener for fastening the first attachment portion to the rail, and wherein said first fastener also serves as said spacer.

15. The energy absorbing mounting structure according to claim 1, wherein the energy absorbing mounting structure further comprises a vehicle seat, and wherein the elongated attachment bracket is fastened to an underside of the seat and rollingly supported by the rail via a linear ball bearing for enabling adjustable seat position.

16. A vehicle including the energy absorbing mounting structure for a vehicle seat according to claim 1.

17. The energy absorbing mounting structure according to claim 1, wherein the deformable element is separate from the rail and wherein the bottom of the rail is located between the deformable element and the vehicle passenger cabin floor structure.

18. An energy absorbing mounting structure for a vehicle seat, the mounting structure comprising:
- a linear rail configured for being fastened to a vehicle passenger cabin floor structure,
- a deformable element, and
- a seat position adjustment arrangement including an elongated attachment bracket that is configured to be slidingly arranged, and connected to, the rail, for enabling seat position adjustment in a longitudinal direction relative to the rail,
- wherein the deformable element has a first attachment portion, a second attachment portion and a deformable section arranged between the first and second attachment portions,
- wherein the first attachment portion is fastened to the rail and the second attachment portion is configured for being fastened to the vehicle passenger cabin floor structure via an opening in a bottom of the rail for enabling relative motion between the floor structure and the rail in a longitudinal direction of the rail by deformation of the deformable section in the event of a vehicle crash,
- wherein the energy absorbing mounting structure comprises the vehicle passenger cabin floor structure and a fastening arrangement for fastening the second attachment portion of the deformable element to the vehicle passenger cabin floor structure, wherein the fastening arrangement includes a single threaded bolt or stud, and
- wherein the opening in the rail has a non-circular form and becomes increasingly narrow along the longitudinal direction of the rail for providing increasing interference with the fastening arrangement upon relative motion between the floor structure and the rail in the longitudinal direction of the rail in the event of a vehicle crash.

19. A method for providing an energy absorbing mounting of a vehicle seat enabling relative motion between a passenger cabin floor structure of the vehicle and a seat rail in a longitudinal direction of the vehicle while absorbing energy by deformation of a deformable element in the event of a vehicle crash, the method comprising:
- providing a linear rail, a deformable element and a seat position adjustment arrangement including an elongated attachment bracket that is configured to be slidingly arranged, and connected to, the rail, for enabling seat position adjustment in a longitudinal direction relative to the rail, wherein the deformable element has a first attachment portion, a second attachment portion and a deformable section arranged between the first and second attachment portions, and wherein the first attachment portion is fastened to the rail,
- fastening the second attachment portion to the vehicle passenger cabin floor structure via an opening in a bottom of the rail, and
- fastening the vehicle seat to the elongated attachment bracket, and
- wherein the rail has a generally U-shaped cross-sectional profile with a hollow interior recess being accessible via an upwards facing opening extending along the longitudinal direction of the rail, wherein the deformable element is located in the hollow interior recess.

* * * * *